United States Patent
Yamaguchi et al.

(10) Patent No.: US 6,577,349 B1
(45) Date of Patent: Jun. 10, 2003

(54) RECEIVER

(75) Inventors: Takashi Yamaguchi, Ibaraki (JP); Ryuji Matsuura, Neyegawa (JP); Toyohiko Matsuta, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/027,389

(22) Filed: Feb. 20, 1998

(30) Foreign Application Priority Data

Feb. 20, 1997 (JP) .............................. 9-035880

(51) Int. Cl.⁷ .............................................. H04N 5/46
(52) U.S. Cl. ...................... 348/556; 348/441; 348/555; 348/706
(58) Field of Search .................. 348/554, 555, 348/556, 441, 445, 459, 458, 706, 705

(56) References Cited

U.S. PATENT DOCUMENTS

| | | | | |
|---|---|---|---|---|
| 4,658,293 A | * | 4/1987 | Arai et al. ................... | 348/448 |
| 4,719,644 A | | 1/1988 | Herzog et al. | |
| 5,257,348 A | | 10/1993 | Roskowski et al. | |
| 5,325,131 A | * | 6/1994 | Penney ....................... | 348/706 |
| 5,530,484 A | * | 6/1996 | Bhatt et al. ................. | 348/556 |
| 5,822,008 A | * | 10/1998 | Inoue et al. ................ | 348/446 |
| 5,926,228 A | * | 7/1999 | Jeon et al. .................. | 348/554 |
| 6,057,889 A | * | 5/2000 | Reitmeier et al. .......... | 348/555 |
| 6,069,664 A | * | 5/2000 | Zhu et al. ................... | 348/448 |
| 6,118,486 A | * | 9/2000 | Reitmeier ................... | 348/441 |
| 6,141,056 A | * | 10/2000 | Westerman ................. | 348/448 |
| 6,147,712 A | * | 11/2000 | Shimamoto et al. ........ | 348/446 |
| 6,177,946 B1 | * | 1/2001 | Sinclair et al. ............. | 345/501 |
| 6,222,589 B1 | * | 4/2001 | Faroudja et al. ........... | 348/448 |

FOREIGN PATENT DOCUMENTS

| | | |
|---|---|---|
| JP | 2 202 106 | 4/1994 |
| JP | 6-098275 | 4/1994 |
| JP | 8-228362 | 9/1996 |
| WO | 0743788 | 11/1986 |

* cited by examiner

*Primary Examiner*—John Miller
*Assistant Examiner*—Trang U. Tran
(74) *Attorney, Agent, or Firm*—RatnerPrestia

(57) ABSTRACT

A receiver to receive a mixture of progressive and interlace video broadcast signals without being conscious of switching between the broadcasting systems. The receiver receives the mixed video broadcast signals having different formats, converts received video signals to video signals having a different signal format from the signal format of the received video signals. The receiver simultaneously outputs the received video signals and the converted video signals. This allows the user to be unaware of any switching when the video input changes between the different broadcasting systems, by connecting a television set to either the interlace scanning system output or the progressive scanning system output of the receiver.

12 Claims, 11 Drawing Sheets

RECEIVER

FIELD OF THE INVENTION

The present invention relates to the field of receivers for receiving mixed television broadcast signals of interlace scanning system signals and progressive scanning system signals.

BACKGROUND OF THE INVENTION

Digital broadcasting is becoming more common. In 1994, for example, the US started a multiple channel satellite digital broadcasting service, and similar services were started in 1996 in Japan and Europe. The use of digital video equipment is also advancing in packaged media systems including Digital Video Disks (DVDs) and Digital Video Cassettes (DVCs).

Digital broadcasting with increasingly higher image quality is also under development. For example, Advanced Television (ATV), planned in the US, is based on 18 standard video formats consisting of 4 interlace scanning system video formats and 14 progressive scanning system video formats. The progressive scanning system, which has good compatibility with personal computers, is given more importance.

In Japan, field tests for satellite transmission of 525p signals (progressive scanning of 525 scanning lines every $\frac{1}{60}$ sec) were carried out by the Japan television broadcast network in 1995 and 1996. Progressive scanning system signals have the same number of scanning lines as current broadcasting systems, but the resolution of moving pictures is greater, and therefore a great improvement in picture quality is expected. This system is scheduled to be commercialized in fiscal 1997.

For digital television broadcasting, for example, 525p with high picture quality and conventional 525i (2:1 interlace scanning of 525 scanning lines every $\frac{1}{30}$ sec, i.e., conventional NTSC) are expected to be mixed and broadcast on the same channel. A receiver of the prior art for the progressive scanning system which is capable of receiving such broadcasts converts input video signals of the interlace scanning system to signals of the progressive scanning system, and outputs only video signals of the progressive scanning system from the output terminal of the receiver. When video signals of the progressive scanning system are input, the receiver outputs the video signals in unmodified form, i.e., without converting them.

On the other hand, a receiver of the prior art for the interlace scanning system, which is capable of receiving mixed broadcast signals, converts input video signals of the progressive scanning system to signals of the interlace scanning system, and outputs only video signals of the interlace scanning system from the output terminal of the receiver. When video signals of the interlace scanning system are input, the receiver outputs the video signals in an unmodified form. i.e., without converting them. In other words, receivers of the prior art are capable of outputting signals in only a single output format.

FIG. 12 shows an example of a receiver of this type. In FIG. 12, a block diagram of major parts of the receiver is combined with a television set 62.

When the receiver receives mixed broadcast signals containing progressive scanning system signals (hereafter referred to as the p signal) and interlace scanning system signals (hereafter referred to as the i signal), the video signals are input through a video signal input terminal 59. A p-i scan converter 60, the major component of the receiver, has the function of converting the p signal to the i signal.

If the television set 62 is compatible with the existing interlace scanning broadcasting, such as NTSC, an i video signal output terminal 61 of the receiver, for outputting the i signal, and an external input terminal 63 of the television set 62 are connected. An external input terminal 64 of the television set 62 and the video signal input terminal 59 of the receiver are also connected. External input terminals 63 and 64 are optionally provided in the television set 62.

With the above connections, the p-i scan converter 60 converts the p signal to an i signal if the video signal input to the receiver is the p signal, and the video signal converted to the i signal is output from the external input terminal 63 of the television set 62 via the i video signal output terminal 61. The p-i scan converter 60 does not operate if the input video signal is the i signal.

If a broadcast signal is the i signal, that signal is directly input to the television set 62 because the external input terminal 64 of the television set 62 and the video signal input terminal 59 are connected.

With the above connections, the user desirably switches the external input terminals 63 and 64 of the television set every time the broadcasting system is switched if both the p signal and i signal are broadcast. In an extreme case, for example, the external input terminals may be expected to be switched every 10-sec in a commercial film.

Moreover, a monitor, television set, video tape recorder, and other equipment, which may be connected to the receiver, have their own switchover function, and accordingly a variety of switching systems exist for the various external input signals. If more than two pieces of external equipment are connected, operation may become even more complicated.

SUMMARY OF THE INVENTION

A receiver of the present invention is capable of receiving mixed video broadcast signals having a plurality of different formats, converting received video signals into video signals having a format different from that of the received signals, and outputting both the converted signals and the unconnected received video signals.

The receiver of the present invention is further capable of receiving mixed video broadcast signals in a plurality of different formats, converting the received video signals into video signals having a plurality of different formats from that of the received video signals, and outputting both the received video signals and a plurality of converted video signals.

Furthermore, the receiver which receives mixed broadcast video signals in a plurality of different formats comprises a plurality of conversion means for converting the received video signals into video'signals having a different signal format from the format of the received signal, and a plurality of switching means for switching between the received video signals and signals converted into the plurality of different formats; and outputs both the received video signals and the converted video signals.

The user may be able to connect a television set compatible with either the interlace scanning system or the progressive scanning system, to a corresponding output terminal for interlace scanning video signals or an output terminal for progressive scanning video signals provided on the receiver. This allows the user to watch television without being conscious of the switching between the different broadcasting systems-even if programs are broadcast in both the progressive scanning system and the interlace scanning system.

DESCRIPTION OF THE PREFERRED EMBODIMENT

First Exemplary Embodiment

Figure 1:
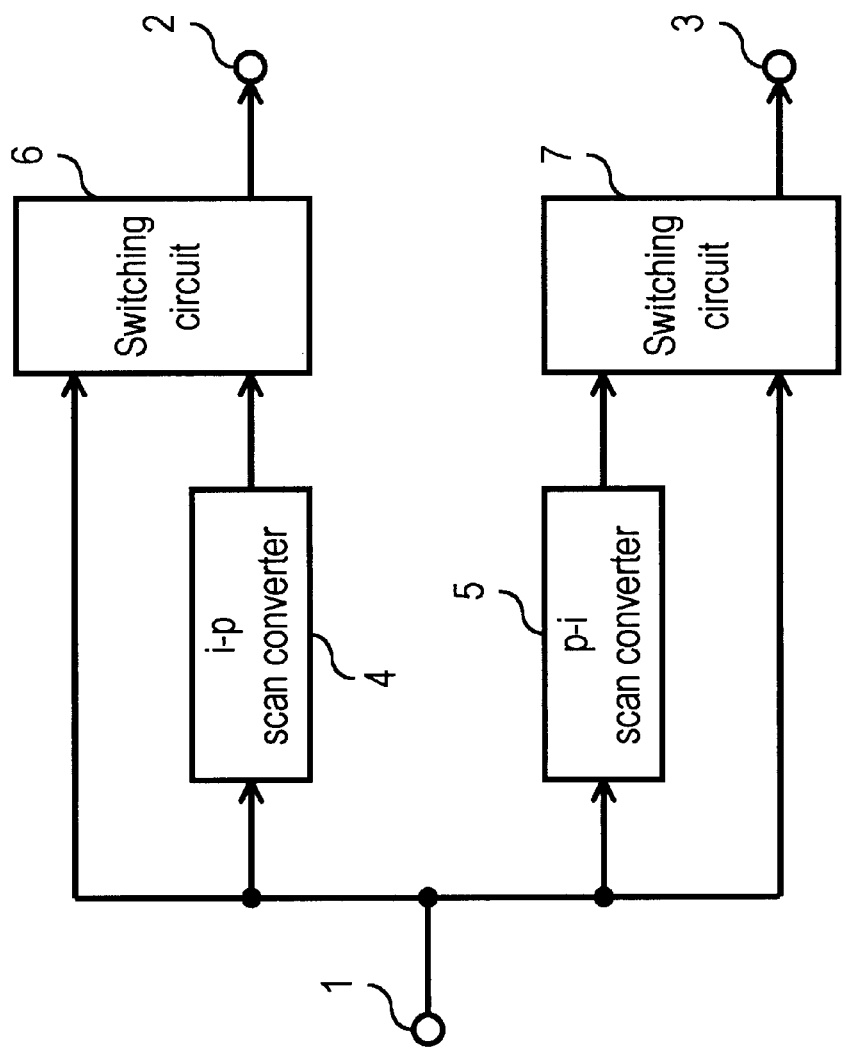
FIG. 1 is a block diagram of a receiver in accordance with a first exemplary embodiment of the present invention.

A receiver in a first exemplary embodiment of the present invention is explained with reference to FIG. 1

The receiver of the first exemplary embodiment comprises a video signal input terminal 1 which receives the video signal of the interlace scanning system (hereafter referred to as the i video signal) or the video signal of the progressive scanning system (hereafter referred to as the p video signal), a p video signal output terminal 2 for outputting the signal selected by a switching circuit 6, and an i video signal output terminal 3 for outputting the signal selected by a switching circuit 7. The receiver is further configured with an i-p scan converter 4, a p-i scan converter 5, a switching circuit 6, and a switching circuit 7. The video signal input to the video signal input terminal 1 is supplied to the i-p scan converter 4, p-i scan converter 5, switching circuit 6, and switching circuit 7. The switching circuit 6 also receives the output signal of the i-p scan converter 4, and the switching circuit 7 also receives the output signal of the p-i scan converter 5.

If a television set is designed to be exclusive to the i signal, the television set is connected to the i video signal output terminal 3 of the receiver. On the other hand, a television set designed to be exclusive to the p signal is connected to the p video signal output terminal 2 of the receiver.

The video signal, encoded by MPEG2, or other format before transmission, is decoded by a decoder (not illustrated). The decoded video signal is input to the video signal input terminal 1 of the receiver. This video signal, as described above, contains both the i video signal and the p video signal on a time base.

First, when the i video signal is input, the i-p scan converter 4 converts the i video signal to the p video signal, and outputs the converted p video signal to the switching circuit 6. The switching circuit 6 selects the converted p video signal, and outputs the converted p video signal to the p video signal output terminal 2. At this point, the p-i scan converter 5 ceases to operate, and the switching circuit 7 selects the input video signal from the i video signal input terminal 1 to output the i video signal to the i video signal output terminal 3. With the above operation, video signals in both formats are simultaneously output from the respective p video signal output terminal 2 and i video signal output terminal 3.

For example, signals may be recordable on a VHS video tape recorder while being viewed as high picture quality p video signal images by connecting the p video signal output terminal 2 to a television set designed to receive the p video signal, and the i video signal output terminal 3 to a VHS video tape recorder.

Next, if the p video signal is input to the video signal input terminal 1, the p-i scan converter 5 converts the p signal into the i signal, arid outputs the i video signal. The switching circuit 7 selects the converted i video signal, and outputs the converted i video signal to the i video signal output terminal 3. At this point, the i-p scan converter 4 ceases to operate, and the switching circuit 6 selects the input video image from the video signal input terminal 1 and outputs the p video signal to the p video signal output terminal 2. With the above operation, video signals in both formats are simultaneously output from the respective p video signal output terminal 2 and the i video signal output terminal 3.

As explained above, the receiver of this exemplary embodiment, by providing a switching function, enables the elimination of switching operations irrespective of whether a television set which receives broadcast signals containing both the i video signal and p video signal is exclusive to the i signal or p signal.

Second Exemplary Embodiment

A block diagram of an i-p scan converter 204 of a receiver in a second exemplary embodiment of the present invention is explained with reference to FIGS. 2 and 3. The receiver in the second exemplary embodiment comprises an i video signal input terminal 8 for receiving the i video signal, an i horizontal/vertical synchronizing pulse input terminal 9 for receiving the horizontal synchronizing pulse and vertical synchronizing pulse of the interlace scanning system. The receiver also has a p video signal output terminal 10, and a p horizontal/vertical synchronizing pulse output terminal 11 for outputting the horizontal synchronizing pulse and vertical synchronizing pulse of the progressive scanning system. This exemplary embodiment employs the i-p scan converter 204 comprising a line memory for time compression 12, a line memory for delay 13, a switching circuit 14, and a double-speed timing generator for progressive scanning signal 15 (hereafter referred to as the p signal double-speed timing generator).

A scanning period of the p signal is a half (½) the scanning period of the i signal. Therefore, the i video signal input from the i video signal input terminal 8 is input to the line memory for time compression 12. Video data stored in the line memory for time compression 12 is compressed by half (½) the time base for each horizontal scanning period, and output to the switching circuit 14. The line memory for delay 13 then receives the output of the line memory for time compression 12 which is compressed by half (½) the time base, delays the line memory output by half (½) the horizontal scanning period, and outputs the delayed line memory output to the switching circuit 14. Accordingly, the output signal of the line memory for time compression 12 and the output signal of the line memory for delay 12 are shifted by half (½) the horizontal scanning period with respect to each other. The switching circuit 14 switches and alternately outputs these two signals, which are mutually shifted by half (½) the horizontal scanning period, as required. The p signal is composed in this way to output composed p video signal from the p video signal output terminal 10.

The p signal double-speed timing generator 15 generates a p horizontal synchronizing pulse and p vertical synchronizing pulse by reducing the period of the i horizontal synchronizing pulse and i vertical synchronizing pulse, input through the i horizontal/vertical synchronizing input terminal 9, by half (½). The generated signal is output to a timing signal output terminal 200 for use as a timing signal in the i-p scan converter. At the same time, the generated signal is output to the p horizontal/vertical synchronizing pulse output terminal 11.

Figure 3:
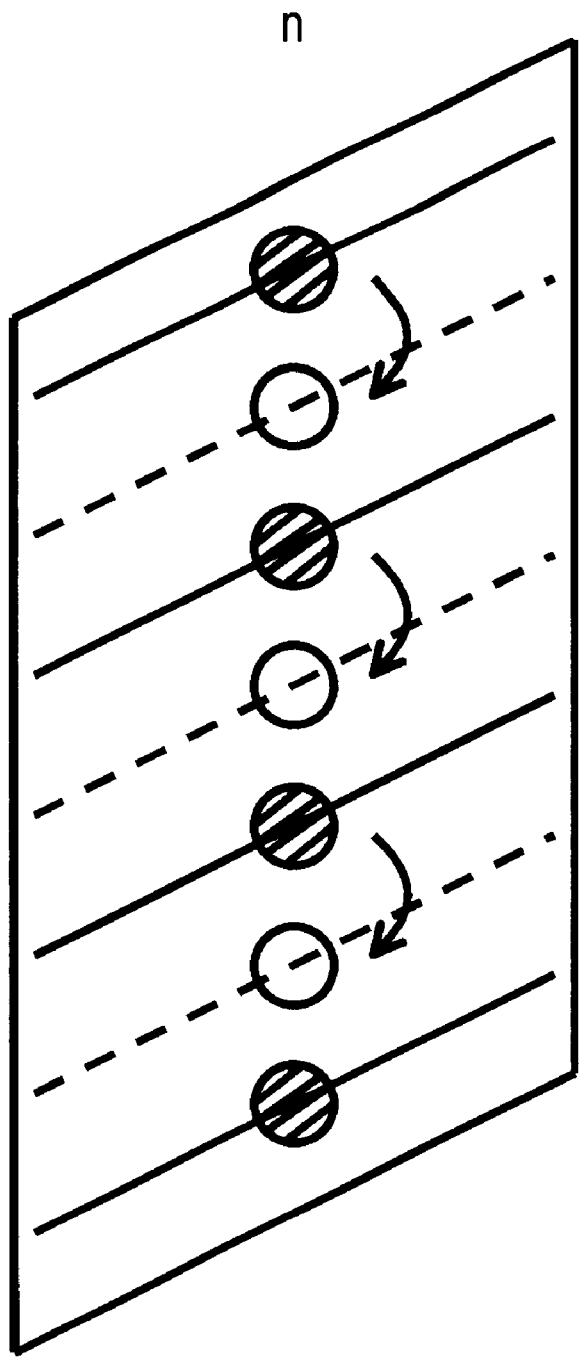
FIG. 3 explains the operation of the i-p scan converter of the receiver in accordance with the second exemplary embodiment of the present invention.

FIG. 3 shows an image of a screen when interpolation is executed for generating the i signal and p signal. In a certain field (n field) of i signal, the video signal of one horizontal scanning line of the i signal is re-scanned before the next scanning line of the i signal. This rescanned signal is used as an interpolation signal for generating the p signal.

The second exemplary embodiment thus offers a more inexpensive receiver employing the i-p scan converter.

Third Exemplary Embodiment

A block diagram of an i-p scan converter 304 in a third exemplary embodiment of the present invention is explained with reference to FIGS. 4 and 5. The receiver of the third exemplary embodiment comprises an i video signal input terminal 16, i horizontal/vertical synchronizing pulse input terminal 17, p video signal output terminal 18, and p horizontal/vertical synchronizing pulse output terminal 19. This exemplary embodiment employs the i-p scan converter 304 comprising a line memory for interpolation 20, adder 21, divider 22, line memory 23, line memory 24, switching circuit 25, and p signal double-speed timing generator 26.

The i video signal input from the i video signal input terminal 16 is input to the line memory for interpolation 20 and also to the adder 21 and the line memory 24. The input i video signal is delayed for one horizontal scanning period in the line memory for interpolation 20. The adder 21 adds this delayed video signal and the original i video signal. The divider 22 then reduces the output level of the adder 21 by half (½), and the divided signal is output to the line memory 23.

This signal stored in the line memory 23 (this is an interpolation video signal) and the original video signal stored in the line memory 24 are converted to double speed on the time base, shifted from each other by half (½) the horizontal scanning period, and output to the switching circuit from respective line memories 23 and 24. The switching circuit 25 alternately switches and outputs these two signals to the p video signal output terminal 18. In this way, the i video signal is converted to a p video signal.

The p signal double-speed timing generator 26 reduces, by half (½), the period of the i horizontal synchronizing pulse and i vertical synchronizing pulse, input through the i horizontal/vertical synchronizing pulse input terminal 17, to generate the p horizontal synchronizing pulse and p vertical synchronizing pulse. The generated synchronizing signal is output to a timing signal output terminal 300 for use as a timing signal in the i-p converter. At the same time, the generated synchronizing signal is output to the p horizontal/vertical synchronizing pulse output terminal 19.

Figure 5:
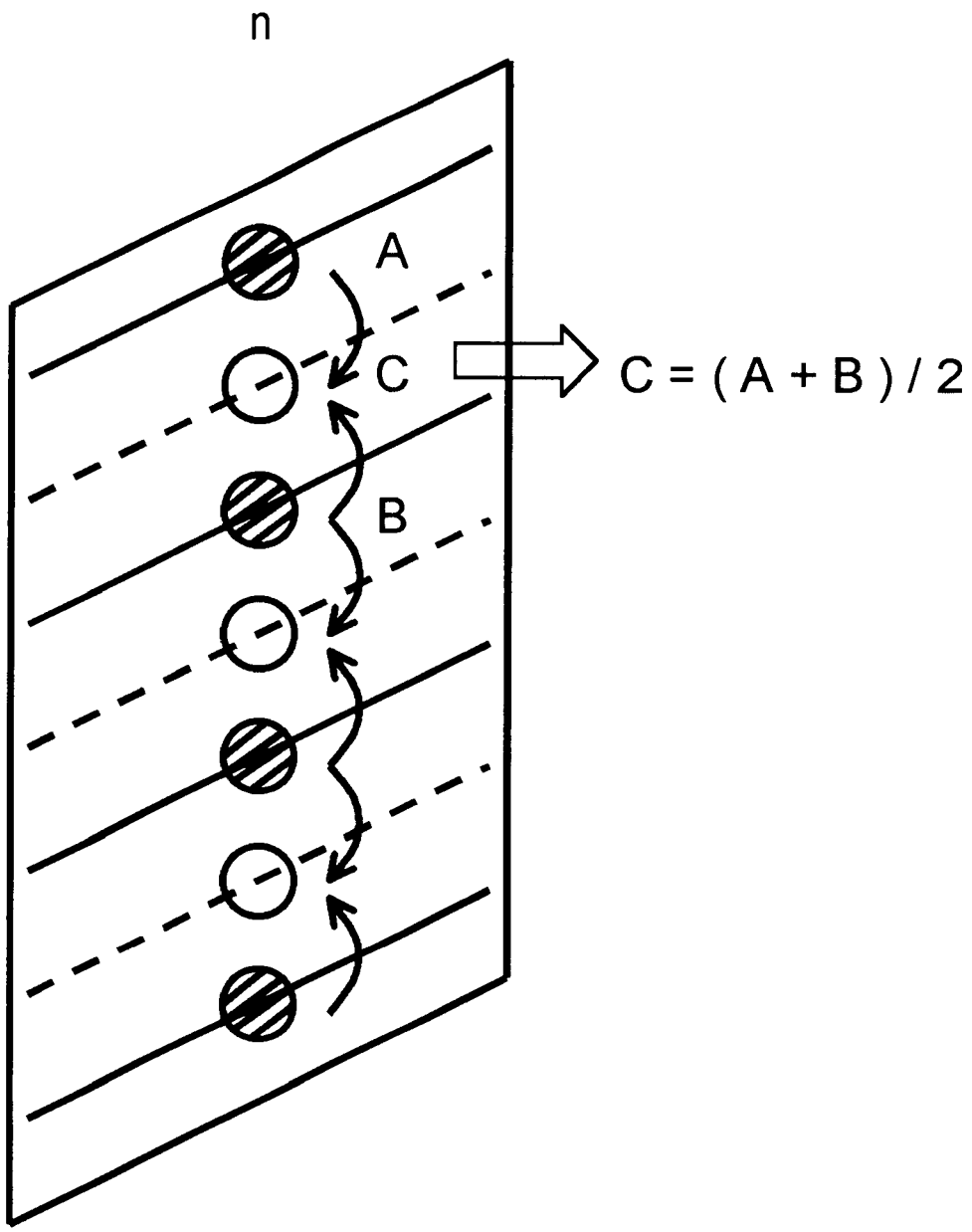
FIG. 5 explains the operation of the i-p scan converter of the receiver in accordance with the third exemplary embodiment of the present invention.

FIG. 5 shows an image of a screen when interpolation is executed for generating the p signal from the i signal. In a certain field (n field) of the i signal, a mean value of a video signal on a scanning line A and a video signal on a scanning line B is calculated. This calculated value is used as a video image on a line C which is an interpolation line for the p signal.

The third exemplary embodiment thus offers a more inexpensive receiver employing the i-p scan converter.

Fourth Exemplary Embodiment

A block diagram of an i-p scan converter 404 of a receiver in accordance with a fourth exemplary embodiment of the present invention is explained with reference to FIGS. 6 and 7. The receiver of the fourth exemplary embodiment comprises an i video signal input terminal 27, i horizontal/vertical synchronizing pulse input terminal 28, p video signal output terminal 29, and p horizontal/vertical synchronizing pulse output terminal 30. This exemplary embodiment employs the i-p scan converter 404 comprising a field memory 31, field memory 32, interfield/in-field interpolator 33, movement detector 34, line memory 35, line memory 36, switching circuit 37, and p signal double-speed timing generator 38.

The i video signal input from the i video signal input terminal 27 is simultaneously supplied to the field memory 31, interfield/in-field interpolator 33, movement detector 34, and line memory 36. The i video signal is delayed by one field in the field memory 31 to create one frame of the p video signal as an interpolation video signal for the original i video signal. This is shown in FIG. 7.

Figure 7:
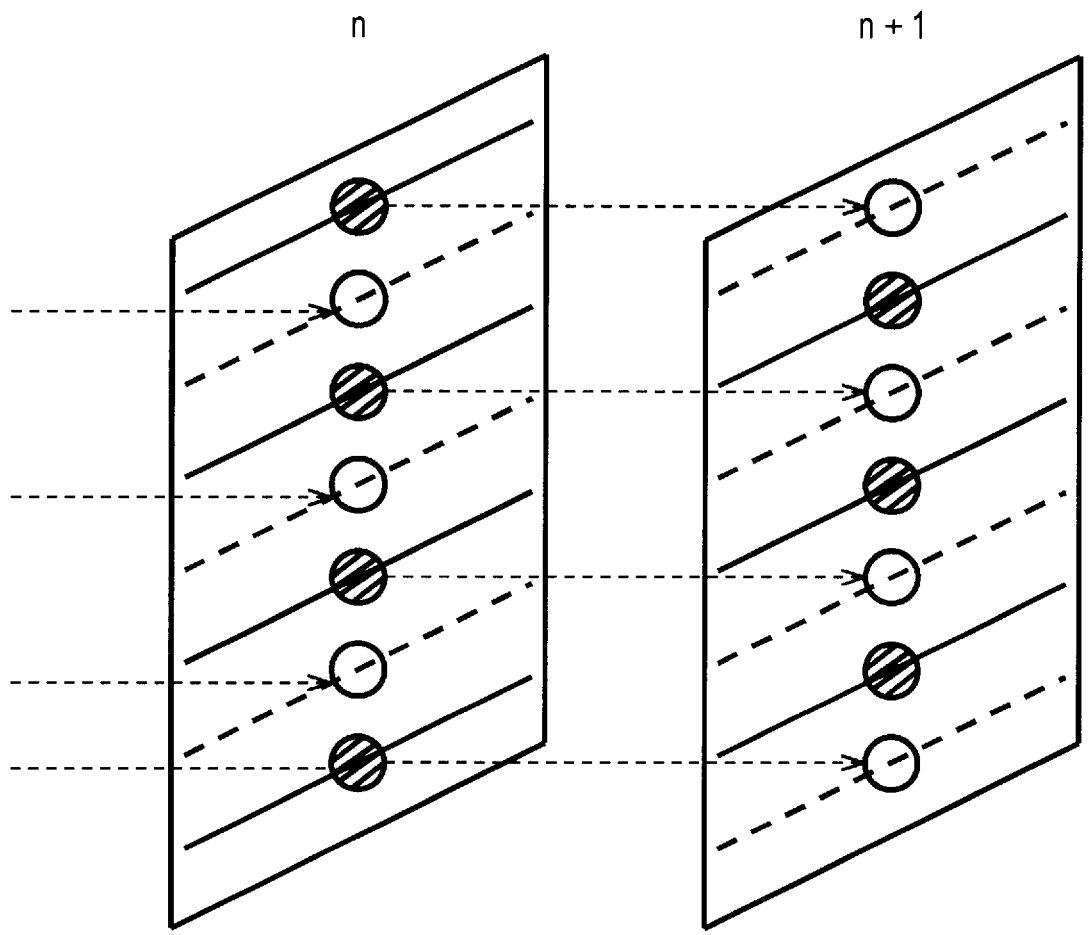
FIG. 7 explains the operation of the i-p scan converter of the receiver in accordance with the fourth exemplary embodiment of the present invention.

In FIG. 7, an i video signal which is in a position corresponding to the p signal in a field (n+1 field) and its previous field (n field), are extracted as an interpolation signal for creating one frame of the p video signal. However, the above interpolation between fields is effective only in a still picture area without any movement.

In the case of a moving video image, in-field interpolation, namely the averaging process of adjacent scanning lines, as shown in FIG. 5, is executed. The movement detector 34 detects an area of movement by comparing the field memory 32, the video signal delayed for 2 fields by the field memory 32, and the original i video signal. Based on this movement detection signal, the interfield/infield interpolator 33 which receives the original i video signal, the output signal of the field memory 31, and the output signal of the field memory 32, executes interfield interpolation for still pictures, and in-field interpolation for moving picture areas.

Figure 4:
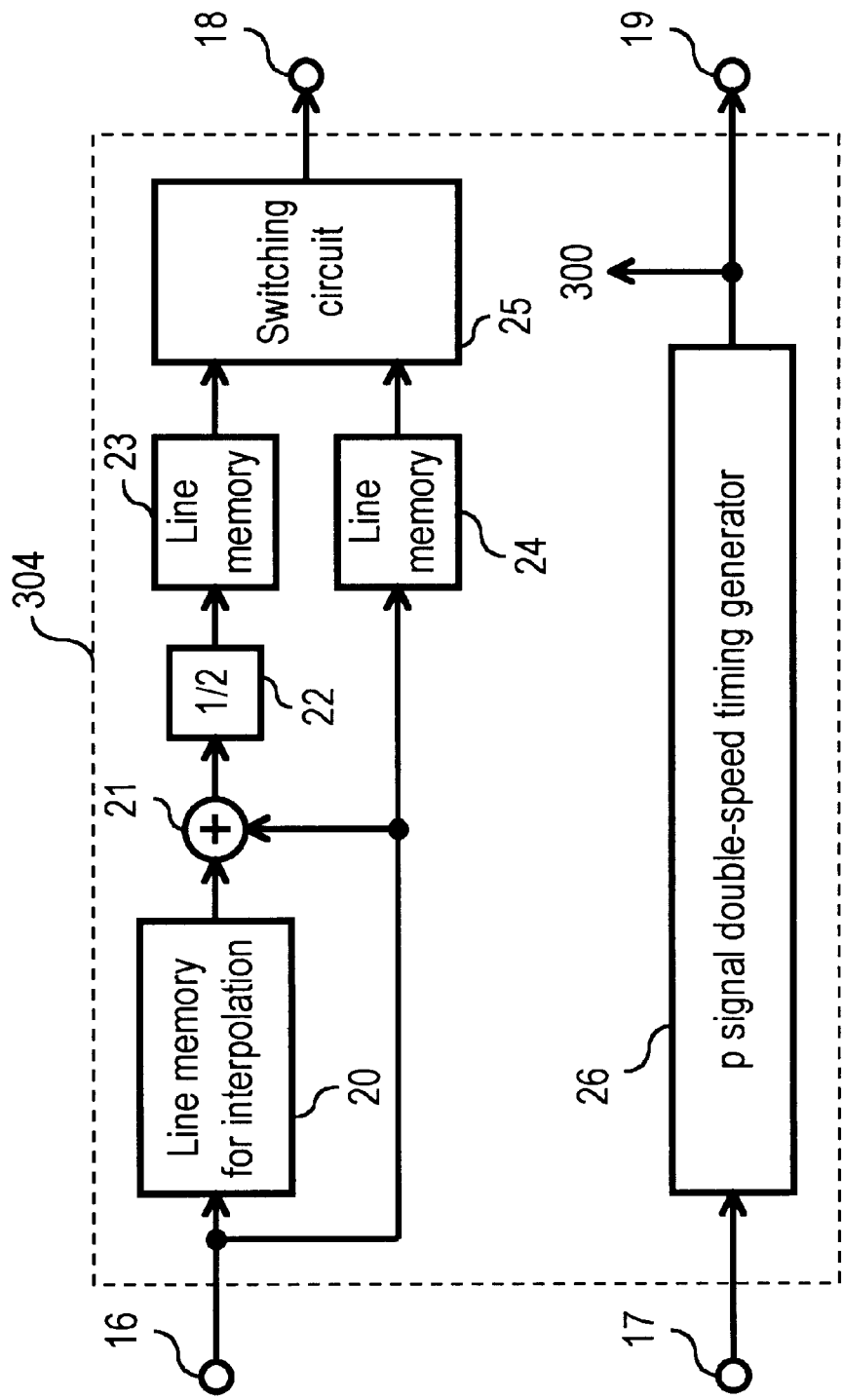
FIG. 4 is a block diagram of an i-p scan converter of a receiver in accordance with a third exemplary embodiment of the present invention.

The line memory 35 which receives the output signal of the interfield/in-field interpolator 33, the line memory 36 which receives the original i video signal, and the switching circuit 37 which switches the output between the output of the line memory 35 and the line memory 36, operate in the same way as the line memory 23, line memory 24, and the switching circuit 25 in FIG. 4 to output the p video signal to the p video signal output terminal 29. The p signal double-speed timing generator 38 receives the i horizontal synchronizing pulse and i vertical synchronizing pulse from the i horizontal/vertical synchronizing pulse input terminal 28, and reduces the period of each pulse by half to generate the p horizontal synchronizing pulse and p vertical synchronizing pulse. The generated synchronizing signal is output to a timing output terminal 400, and is also used as a timing signal in the i-p scan converter. At the same time, the generated synchronizing signal is output to the p horizontal/vertical synchronizing pulse output terminal 30.

The receiver, which employs the i-p scan converter in the fourth exemplary embodiment, reduces the side effect in the secondary exemplary embodiment, which is that the vertical resolution of still pictures may not be improved by rescanning the same scanning line, and that flickering of scanning lines is noticeable. The i-p scan converter in this exemplary embodiment may also improve a remaining problem in the third exemplary embodiment, which is that vertical resolution of still pictures may not be improved by the process of averaging adjacent scanning lines and lower vertical resolution for moving pictures.

Fifth Exemplary Embodiment

A block diagram of an i-p scan converter 504 of a receiver in a fifth exemplary embodiment of the present invention is explained with reference to FIG. 8. The receiver in the fifth exemplary embodiment comprises an i video signal input terminal 39, i horizontal/vertical synchronizing pulse input terminal 40, p video signal output terminal 41, and p horizontal/vertical synchronizing pulse output terminal 42. This exemplary embodiment employs the i-p scan converter 504 comprising an interpolation line memory 43, adder 44, divider 45, line memory 46, line memory 47, switching circuit 48, and p signal double-speed timing generator 49.

The receiver in this exemplary embodiment reduces the signal level of the interpolated video signal to improve apparent deterioration in vertical resolution due to characteristics of display devices, such as CRTs. The configuration shown in FIG. 8 is basically the same as FIG. 4. The difference is that the divider 45 reduces the video signal level within a range of 0 to ½. Since the operation of other components are the same as that explained in FIG. 4, the explanation is not repeated.

Figure 2:
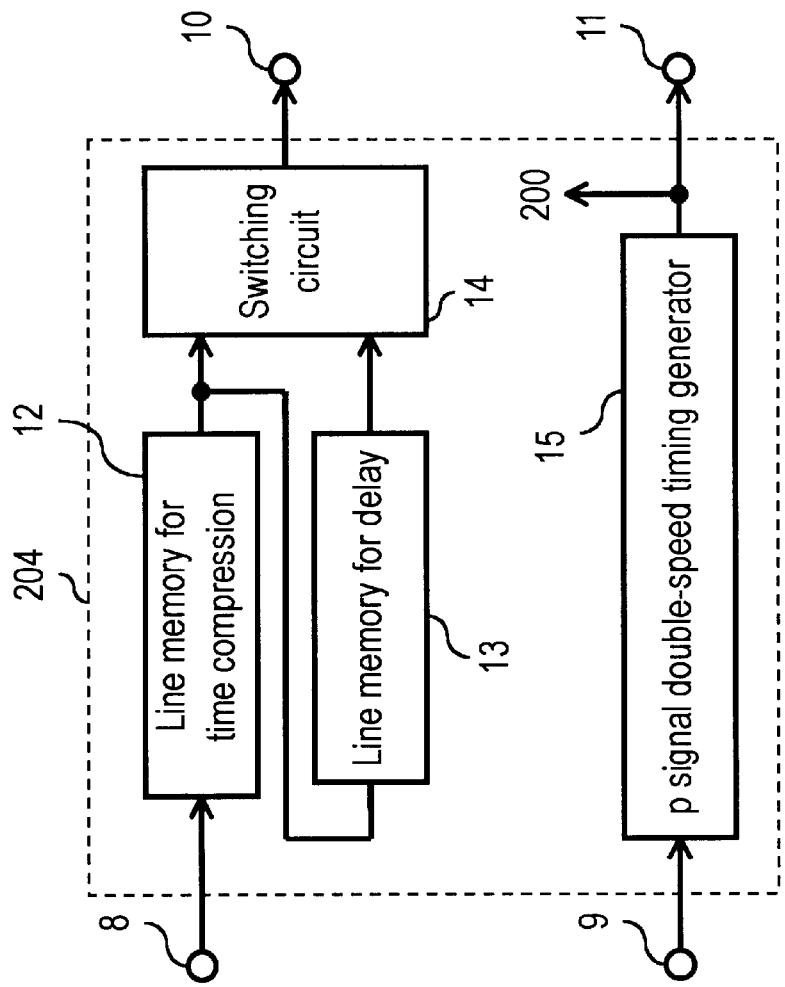
FIG. 2 is a block diagram of an i-p scan converter of a receiver in accordance with a second exemplary embodiment of the present invention.
Figure 6:
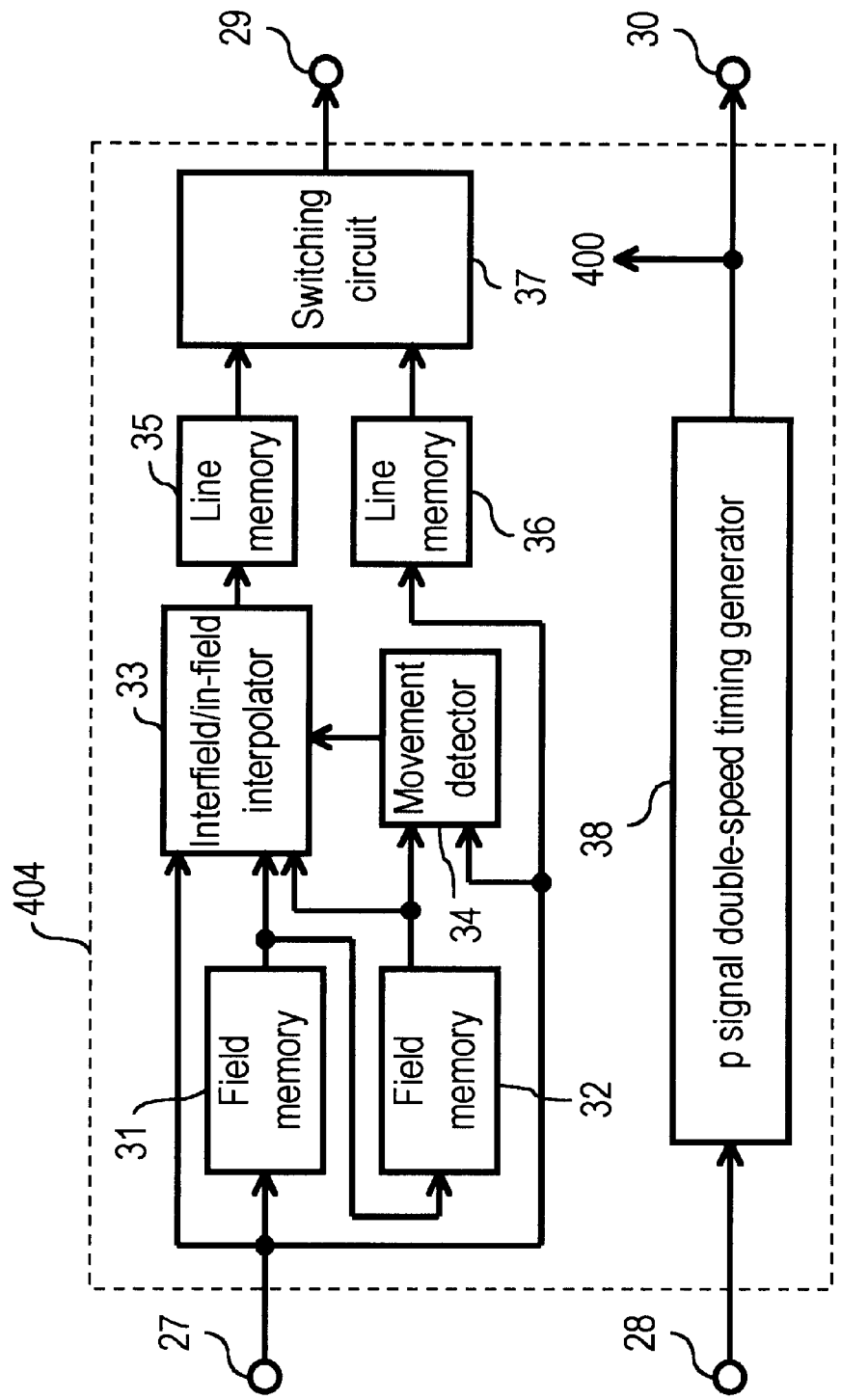
FIG. 6 is a block diagram of an i-p scan converter of a receiver in accordance with a fourth exemplary embodiment of the present invention.
Figure 8:
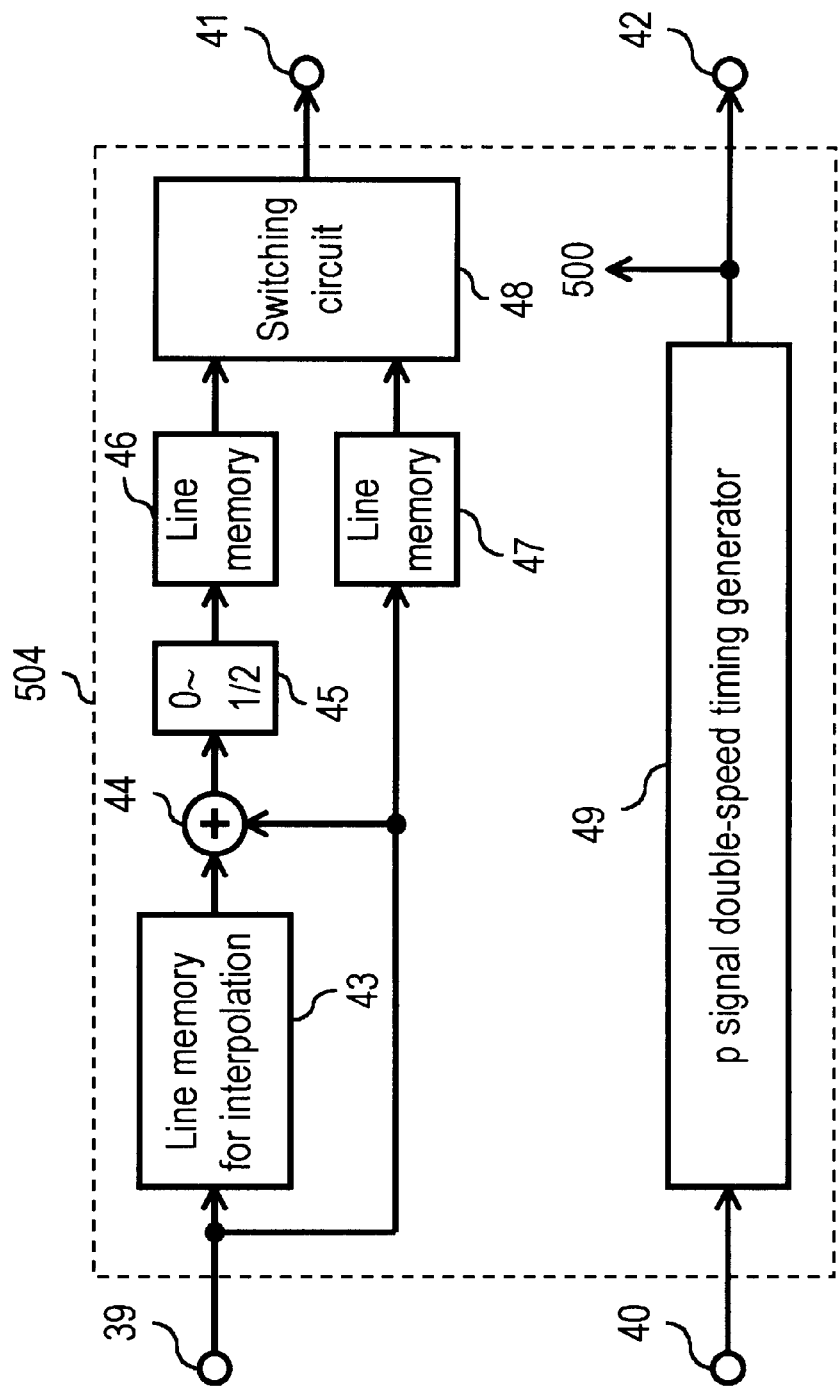
FIG. 8 is a block diagram of an i-p scan converter of a receiver in accordance with a fifth exemplary embodiment of the present invention.

By inserting the divider 45 (which can reduce the video signal level within a range of 0 to ½) in FIG. 8, after the delay line memory 13 in FIG. 2 or after the line memory 35 in FIG. 6, deterioration of apparent vertical resolution can also be improved in the receivers of the second and fourth exemplary embodiments.

Sixth Exemplary Embodiment

A block diagram of a p-i scan converter of a receiver in a sixth exemplary embodiment of the present invention is explained with reference to FIG. 9. The receiver in the sixth exemplary embodiment comprises a p video signal input terminal 50, p horizontal/vertical synchronizing output terminal 51, i video signal output terminal 52, and i horizontal/vertical synchronizing pulse output terminal 53. This exemplary embodiment employs the p-i scan converter 605 comprising a line memory for delay 54, adder 55, divider 56, line memory 57, and timing generator for interlace scanning signals (i signal timing generator) 58.

The adder 55 adds the p video signal delayed for one scanning line in the delay line memory 54 and the original p video signal, and the divider 56 calculates a mean value to generate video data for the i signal. The output signal of the divider 56 is doubled with respect to a time base in the line memory 57 to obtain the i video signal output. The i video signal is output to the i video signal output terminal 52. The i signal timing generator 58 receives the p horizontal synchronizing pulse and p vertical synchronizing pulse from the p horizontal/vertical synchronizing pulse input terminal 51, and doubles their period to generate the i horizontal synchronizing pulse and i vertical synchronizing pulse. The generated synchronizing pulses are output to a timing output terminal 600, and used as a timing signal in the p-i converter. At the same time, the generated synchronizing signal is output to the i horizontal/vertical synchronizing pulse output terminal 53.

Figure 9:
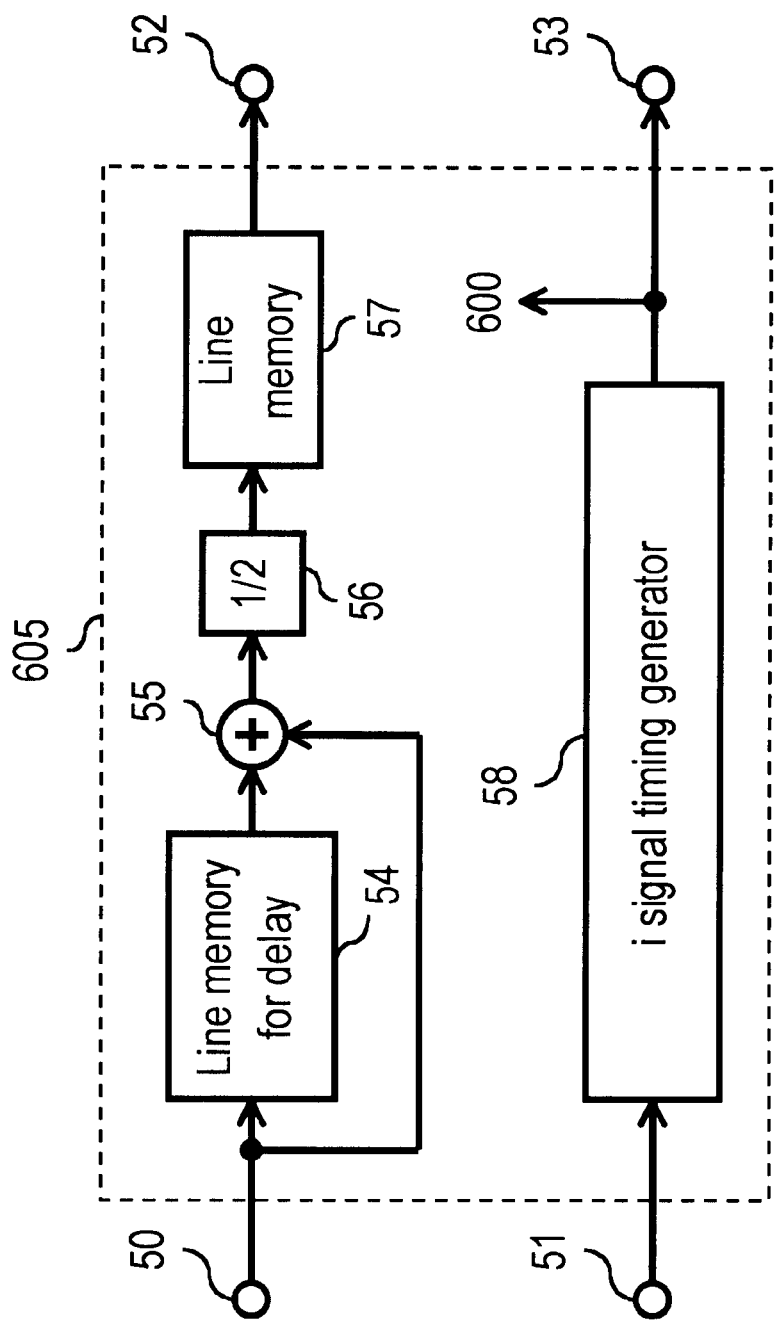
FIG. 9 is a block diagram of a p-i scan converter of a receiver in accordance with a sixth exemplary embodiment of the present invention.

In FIG. 9 line memory for delay 54, adder 55, and divider 56 comprise a low-pass filter between two lines in the vertical direction of the display device. If the number of the line memory for delay 54 is increased from one to several, bandwidth characteristics in the vertical direction of the display device will become flat and display quality will be improved.

Seventh Exemplary Embodiment

A block diagram of a receiver in a seventh exemplary embodiment of the present invention is explained with reference to FIGS. 10 and 11. The receiver of the seventh exemplary embodiment comprises the i-p scan converter 4, p-i scan converter 5, switching circuit 6, switching circuit 7, and a decoder 101. The decoder 101 decodes broadcast signals encoded by MPEG2, for example, and outputs the i video signal or p video signal in response to the format of the video signal in the received broadcast signal. At the same time, the decoder 101 outputs i/p identifying information which informs the switching circuits 6 and 7 whether the format of the received video signal is the i video signal or p video signal to control each switching circuit to output its respective signal type. The video signal decoded by the decoder 101 is supplied to the i-p scan converter 4, p-i scan converter 5, switching circuit 6, and switching circuit 7. The signal input to the i-p scan converter 4 is scan converted from i to p, and is input to the switching circuit 7. The signal input to the p-i scan converter 5 is scan converted from p to i, and is output to the switching circuit 6.

With the above configuration, the receiver in the seventh exemplary embodiment identifies the format of the input video signal, and converts signals in the i-p scan converter 4 or p-i scan converter 5 for outputting:

1) the i signal in an unmodified form from the switching circuit 6, and the converted p signal from the switching circuit 7, which is converted by the i-p converter 4, when the decoder 101 receives the i signal, and 2) the p signal in an unmodified form from the switching circuit 7 and the converted i signal from the switching circuit 6, which is converted by the p-i scan converter 5, when the decoder 101 receives the p signal.

Figure 10:
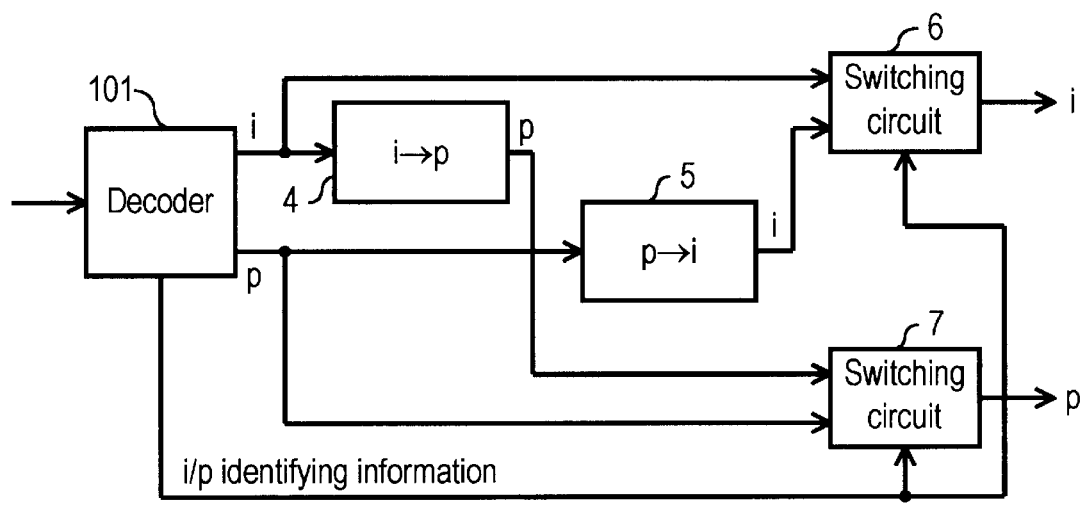
FIG. 10 is a block diagram of a receiver in accordance with a seventh exemplary embodiment of the present invention.
Figure 11:
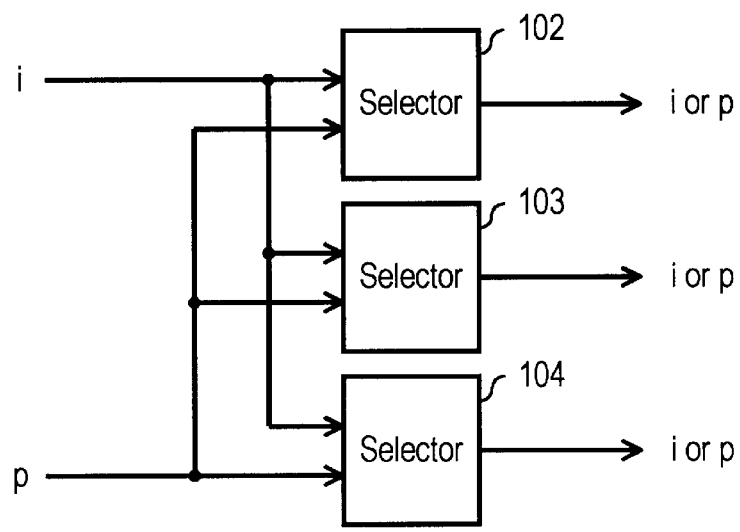
FIG. 11 is a block diagram of a selector in a seventh exemplary embodiment of the present invention.
Figure 12:
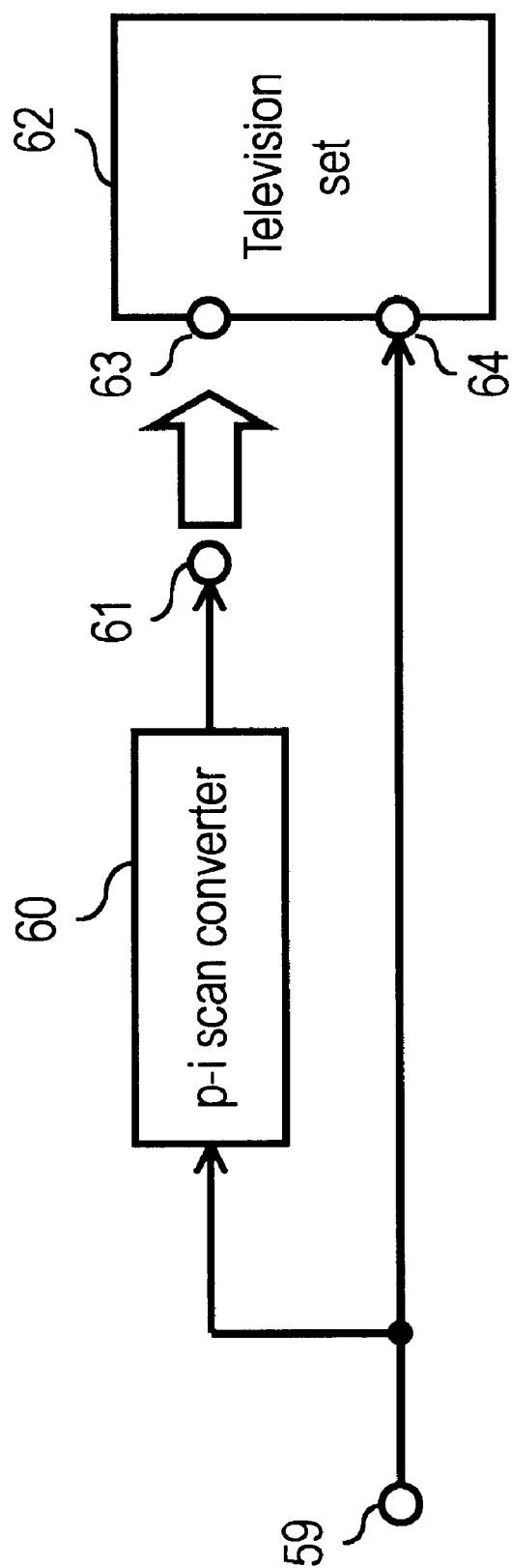
FIG. 12 explains the operation of a receiver of the prior art.

A selector in FIG. 11 may be further provided downstream of the process of FIG. 10. In other words, selectors 102, 103, and 104 have two input terminals and one output terminal, and the i signal is input to one input terminal, and the p signal is input to the other input terminal for selecting and outputting either the i signal or the p signal. Four or more selectors may also be provided in place of the three selectors shown in FIG. 11.

This configuration allows for the independent switching of selectors 102, 103, and 104, when a video image is output to more than one piece of external equipment, including monitors, television sets, and video tape recorders. The output of each selector can be freely determined even if each piece of external equipment is specific to the i video signal or the p video signal.

Furthermore, by providing the decoder 101 with the function of detecting which video signal can be successfully input to external equipment connected to the selectors 102, 103, and 104, the output of the selectors 102, 103, and 104 can be switched in response to the detected signal.

In FIG. 11 above, the 1 signal (composite signal) consisting of luminance and two color difference signals are assumed to be used as both the i input signal and the p input signal. If the component signal is input as the p signal, the selectors 102, 103, and 104 may be configured to select the 1 p signal (two component signals of luminance and color difference signals) or the 3 i signals (composite).

With the use of the receiver of the present invention as configured above, scan conversion of the p signal to an i signal, for receiving mixed broadcast signals of the p signal and i signal, is automatically implemented to allow receiving of broadcasts in more preferred manner.

Specifically, the user may simply desire to connect either the i video signal output terminal or the p video signal output terminal of the receiver, depending on the broadcasting format accepted by the television set.

The receiver can also be connected to external equipment which can process only one video signal format without the need for switchover. This allows simplification of operation, even when more than two pieces of external equipment are connected.

The exemplary embodiments of the pre sent invention are explained with reference to receiving broadcast signals containing two types of signals, i.e., the i video signal and the p video signal. However, the present invention is not limited to these two types of signals. For receiving broadcast signals of three or more types, for example, the number of circuit components including scan converters, switching circuits, input terminals and output terminals may simply be increased as desired. The preferred embodiments described herein are therefore illustrative and not restrictive. The scope of the invention being indicated by the appended claims and all modifications which come within the true spirit of the claims are intended to be embraced therein.

What is claimed is:

1. A receiver for use with an input video signal having a plurality of formats, said receiver comprising:
   input means for receiving the input video signal in one of said formats followed by another of said formats on a time base;
   a first converter for converting the video signal from said one of said formats to said another of said formats different than said one of said formats as a first video signal; and
   a second converter for converting the input video signal from said another of said formats to said one of said formats as a second video signal;
   a first switch for switching between the input video signal and the first video signal;
   a second switch for switching between the input video signal and the second video signal; and
   wherein said receiver simultaneously outputs the input video signal and one of the first video signal and the second video signal.

2. A receiver as defined in claim 1, wherein said video signal is one of an i) interlace scanning system video signal and ii) a progressive scanning system video signal.

3. A receiver as defined in claim 2, wherein said interlace scanning system video signal is converted into the progressive scanning system video signal by scanning the interlace scanning system video signal twice for each scanning line of the video signal.

4. A receiver as defined in claim 2, further comprising a conversion circuit for converting the interlace scanning system video signal into the progressive scanning system video signal by interpolating the interlace scanning system video signals using in-field interpolation to generate a progressive frame for the progressive scanning system video signal.

5. A receiver as defined in claim 2, wherein the video signal is converted into the progressive scanning system video signal by detecting a motion component of the video signal, and switching between an in-field interpolation and an interfield interpolation of the video signal based on said motion component.

6. A receiver as defined in claim 2, further comprising a conversion circuit for converting the interlace scanning system video signal into the progressive scanning system video signal, said conversion means converting to the progressing scanning system video signal by i) detecting a movement area of the video signal and ii) switching between an in-field and an interfield interpolation of the video signal based on said movement area.

7. A receiver as defined in claim 3, wherein said conversion circuit reduces a signal level of the video signal on an interpolated scanning line.

8. A receiver as defined in claim 2, further comprising:
   a conversion circuit for converting the progressive scanning system video signal into the interlace scanning system video signal, said conversion circuit including a low-pass filter for a vertical screen direction, and
   curtail means for curtailing scanning lines of the interlace scanning video signal.

9. A receiver as defined in claim 2, further comprising
   decoding means for outputting identifying information for identifying at least one of i) a format of the video signal, ii) video signals in a first format, and iii) video signals in a second format, and for outputting the video signal in the first format and the video signals in the second format;
   a first scan conversion means for converting the video signals in the first format output from said decoding means into converted video signals in the second format;
   a second conversion means for converting video signals in the second format output from said decoding means into converted video signals in the first format;
   a first switching means for switching between the video signals in the first format output from said decoding means and the converted video signals in the first format output from the second conversion means based on said identifying information; and
   a second switching means for switching between the video signals in the second format output from said decoding means and the converted video signals in the second format output from the first conversion means.

10. A receiver as defined in claim 9, further comprising a plurality of selecting means for receiving respective video signals in the first format and video signals in the second format from said first switching means and said second switching means, wherein each selecting means selects one of the plurality of formats of the video signals as a respective output.

11. A receiver as defined in claim 4, wherein said conversion circuit reduces a signal level of the video signal on an interpolated scanning line.

12. A receiver as define in claim 5, wherein said conversion circuit reduces a signal level of the video signal on an interpolated scanning line.

* * * * *

UNITED STATES PATENT AND TRADEMARK OFFICE
CERTIFICATE OF CORRECTION

PATENT NO.   : 6,577,349 B1
DATED        : June 10, 2003
INVENTOR(S)  : Yamaguchi et al.

It is certified that error appears in the above-identified patent and that said Letters Patent is hereby corrected as shown below:

<u>Title page,</u>
Item [75], Inventors, delete "Ibaraki" and insert -- Osaka --; delete "Neyegawa" and Insert -- Osaka --; delete "Katano" and insert -- Osaka --
Item [56], References Cited, FOREIGN PATENT DOCUMENTS, delete "JP 2 202 106" and insert -- GB 2 202 106 --; and delete "WO 0743788" and Insert -- EP 0743788 --

Signed and Sealed this

Sixteenth Day of March, 2004

JON W. DUDAS
*Acting Director of the United States Patent and Trademark Office*